UNITED STATES PATENT OFFICE.

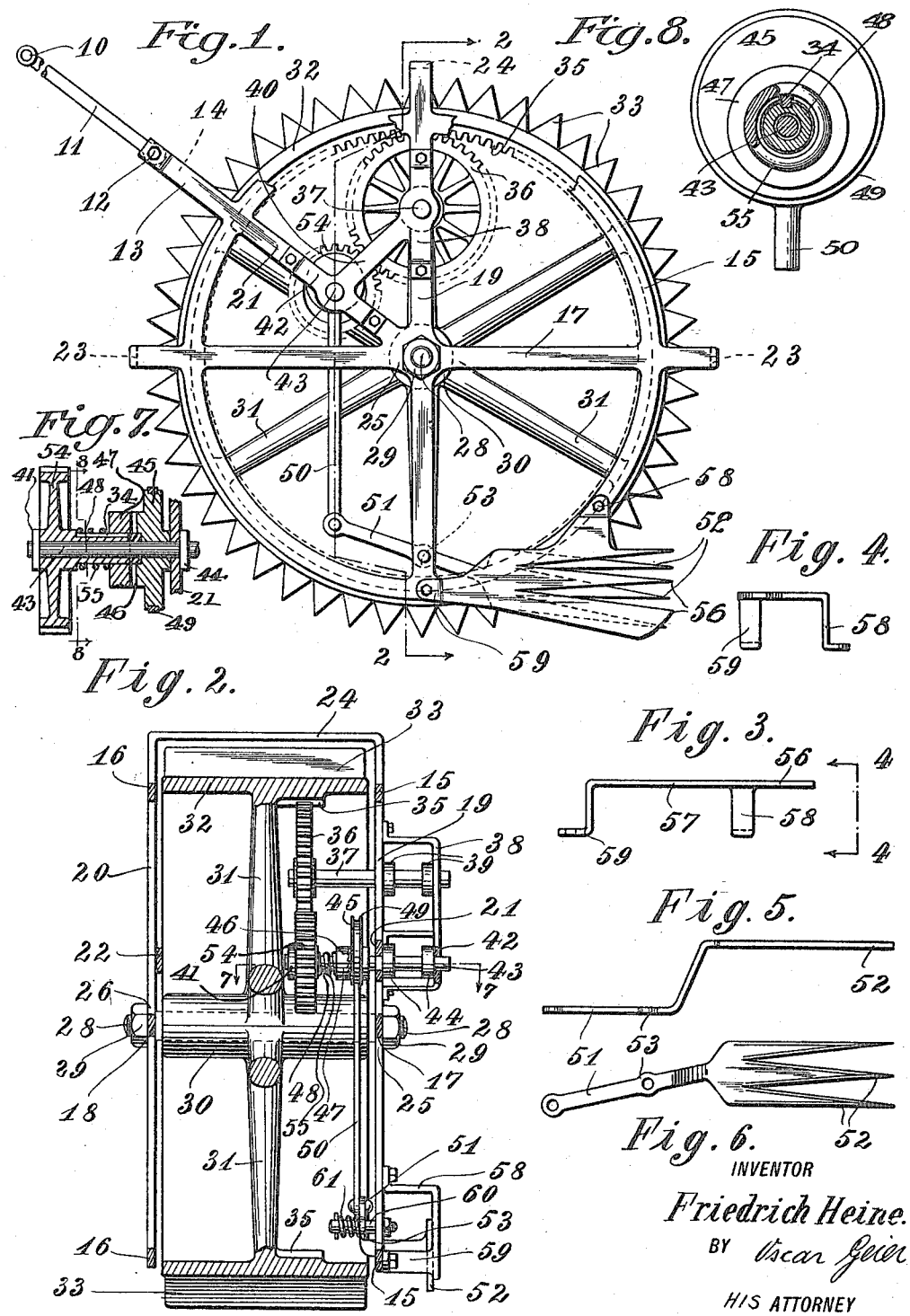

FRIEDRICH HEINE, OF WHITE PLAINS, NEW YORK.

LAWN-TRIMMER.

1,216,566.   Specification of Letters Patent.   Patented Feb. 20, 1917.

Application filed December 20, 1915. Serial No. 67,746.

*To all whom it may concern:*

Be it known that I, FRIEDRICH HEINE, a subject of the Emperor of Germany, and resident of White Plains, in the county of Westchester and State of New York, have invented certain new and useful Improvements in Lawn-Trimmers, of which the following is a specification.

This invention relates to improvements in mechanisms for trimming the edges of lawns, or grassy fields along walks, roads or pathways where overhanging growth is objectionable.

The principal object is to provide a machine capable of being easily propelled by an operator along such walks, which will closely trim any plants, grass or the like to the confines of the walk, thereby maintaining a neat and attractive appearance.

Another object is to provide such mechanisms in forms cheap to construct, having long wearing qualities and which can be operated by unskilled labor in an efficient and satisfactory manner.

These and other similar objects are attained by the novel construction and combination of parts hereinafter described and shown in the annexed drawing, forming part of this specification and in which:—

Figure 1 is a side elevation of a lawn edge trimmer, made in accordance with the invention, the handle part being broken away.

Fig. 2 is a partial rear, partial sectional view, taken substantially on line 2—2 of Fig. 1.

Fig. 3 is a top plan view in detail of the fixed shears.

Fig. 4 is an end view of the same looking in the direction indicated by the line 4—4 of Fig. 3.

Fig. 5 is a top plan view of the oscillating shear blades.

Fig. 6 is a top plan view of the same, and

Fig. 7 is an enlarged sectional view taken on line 7—7 of Fig. 2.

Fig. 8 is a transverse sectional view drawn to an enlarged scale, showing portions of the shaft and clutch mechanism.

The machine is adapted to be propelled and guided along the walk by an operator grasping the T shaped handle 10, the stem 11 of which is arranged centrally of the mechanism, at a convenient angle, and engaged with a cross bar 12 from which extend the elements 13 and 14 of the sides.

These sides are formed respectively right and left and are comprised of ring elements 15 and 16, having horizontal cross bars 17 and 18, vertical bars 19 and 20 and angularly disposed bars 21 and 22, from which extend the elements 13 and 14.

Similarly the bars 17 and 18 are extended beyond the ring and connected by the members 23; also the upright bars 19 and 20 are joined by the member 24, the bottom being left open for obvious reasons.

This frame is supported by the shaft 28, passing through the hubs 25 and 26, formed at the junction of the several bars, and secured against a shoulder on the shaft by the nuts 29 at its ends.

On the enlarged central part of the shaft is mounted an elongated hub 30 having radiating spokes 31 terminating in the rim 32, across the periphery of which is formed a plurality of angular wedge shaped teeth 33, adapted to engage with the surface of the walk and cause the wheel to revolve as it is propelled.

The interior of the wheel rim 32 has formed with it annular rack teeth or an internal gear 35 by means of which rotary motion is conveyed to the idle gear 36, mounted on the shaft 37, supported partially by the bar 19 and the bracket 38 bolted to it, and held against lateral motion by the collars 39 set screwed to the shaft as shown.

An arm 40 extends from the bracket 38 to the angularly disposed bracket 42 in which is mounted the shaft 43, having limiting set screwed collars 44, and passing through the bar 21, on the other side of which is secured an eccentric 45 fastened by set screws, and having a hub 46, formed with lateral teeth, engageable with which are the teeth formed on the end of a collar 47, slidably mounted on the sleeve 48 formed with the pinion 54.

The teeth of both elements 46 and 47 are so shaped as to positively engage when the collar is rotated in one direction, in the manner of a crab clutch, but when the collar is rotated in a reverse direction the angular sides of the teeth cause the collar to slide between the pinion 54 and the collar on the sleeve 48, the latter having a keyway 34 to receive a key set in the collar 47 and by which it is driven.

A coiled push spring 55 surrounds the sleeve 48, exerting pressure to keep the teeth of the sliding collar 47 normally in engagement with the teeth on the hub 46, and a fixed collar 41 maintains the pinion from sliding off the shaft 43, upon which it and its sleeve freely revolve when driven by the gear 36.

On the eccentric 45 is a ring 49 connected with a rod 50, the lower end of which is pivotally engaged with the arm 51, of the offset shear, having blades 52, the shear blades being pivoted at 53 on the lower part of the bar 19, the blades being given a reciprocal oscillating action by the eccentric 45 so that the several cutting edges 52 are actuated in close relation to the fixed blades 56 of the stationary cutter 57, held rigidly by the integral arms 58 and 59 to the ring 15 and bottom of the bar 19.

A stud 60 is set rigidly in the bar 19 and on it is a coiled push spring 61 exerting pressure to keep the blades 52 and 56 in close operative shearing relation.

Thus when the mechanism is propelled along the surface of a walk, the cutter blades are caused to move reciprocatively in the manner of shears, trimming any overhanging growths along the edges, but when the machine is moved backward the clutches 46 and 47 are caused to separate and the blades remain quiescent.

It is to be noted that the shear blades may be depressed to trim close to the surface or elevated a considerable height by raising or lowering the handle correspondingly.

Having thus described my invention, what I claim as new and desire to secure by Letters Patent is:—

1. In a trimmer, the combination with a rigid frame, a spurred wheel upon which said frame is revolubly mounted, and a propelling means for said frame, of a pair of shears, each having a plurality of cutting blades one being fixed to said frame and the other movable, said shears being at one side of said frame, and extending normally horizontal to and above the path of said wheel, means for operating said movable shear coöperatively with said fixed shear, said means being operatively combined with said wheel and means for maintaining said shears in operative contact.

2. In a trimmer, the combination with a rigid frame, a propelling means therefor, a wheel upon which said frame is revolubly mounted, and means for causing said wheel to positively rotate as it is advanced, of a pair of shears, each having a plurality of cutting blades one being affixed to said frame laterally and in advance thereof, the other shear being movable relative thereto, an arm on said movable shear, an internal gear formed with said wheel, a pinion driven thereby, a shaft on which said pinion is mounted, an eccentric having a toothed hub revoluble on said shaft, operative connections between said eccentric and said shear arm, a toothed collar slidably combined with said pinion adapted to operatively engage said toothed hub when said frame is moved forward and to become released from engagement when said frame moves rearward, and means to maintain the teeth of said element normally in engagement.

Signed at New York, in the county of New York and State of New York, this 22nd day of October A. D. 1915.

FRIEDRICH HEINE.

Witnesses:
O. A. GEIER,
ADELAIDE BEISNER.

Copies of this patent may be obtained for five cents each, by addressing the "Commissioner of Patents, Washington, D. C."